(12) United States Patent
Krishnaswamy

(10) Patent No.: US 8,379,552 B2
(45) Date of Patent: *Feb. 19, 2013

(54) TRANSMISSION ADAPTATION IN A WIRELESS NETWORK

(75) Inventor: Dilip Krishnaswamy, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 13/351,097

(22) Filed: Jan. 16, 2012

(65) Prior Publication Data

US 2012/0113856 A1    May 10, 2012

Related U.S. Application Data

(63) Continuation of application No. 11/240,085, filed on Sep. 30, 2005, now Pat. No. 8,098,603.

(51) Int. Cl.
*H04B 7/00* (2006.01)
*H04B 7/216* (2006.01)
*H04J 3/00* (2006.01)
*G06F 15/173* (2006.01)

(52) U.S. Cl. ........ 370/310; 370/335; 370/498; 370/235; 709/224; 709/203

(58) Field of Classification Search .................. None
See application file for complete search history.

(56) References Cited

U.S. PATENT DOCUMENTS

| 5,668,738 | A | 9/1997 | Ataras, III |
| 6,564,243 | B1 | 5/2003 | Yedidia et al. |
| 7,254,120 | B2 | 8/2007 | LeBlanc |
| 8,098,603 | B2 | 1/2012 | Krishnaswamy |
| 2006/0088063 | A1 * | 4/2006 | Hartung et al. ............... 370/498 |
| 2008/0273478 | A1 * | 11/2008 | Budde et al. .................. 370/311 |

FOREIGN PATENT DOCUMENTS

WO    WO 2006003568 A1 *    1/2006

OTHER PUBLICATIONS

"U.S. Appl. No. 11/240,085, Response filed Aug. 29, 2011 to Non Final Office Action mailed May 27, 2011", 13 pgs.
"U.S. Appl. No. 11/240,085, Final Office Action mailed Nov. 30, 2009", 9 pgs.
"U.S. Appl. No. 11/240,085, Non Final Office Action mailed Jun. 27, 2008", 6 pgs.
"U.S. Appl. No. 11/240,085, Non Final Office Action mailed May 27, 2011", 11 pgs.
"U.S. Appl. No. 11/240,085, Non-Final Office Action mailed Apr. 1, 2009", 9 pgs.

(Continued)

*Primary Examiner* — Jinsong Hu
*Assistant Examiner* — William Nealon
(74) *Attorney, Agent, or Firm* — Schwegman, Lundberg & Woessner, P.A.

(57) ABSTRACT

An arrangement is provided for adapting the output bit rate of a multimedia source to the bandwidth available in a wireless network. Depending on the value of the available network idle time, at least a portion of the available network idle time may be used by the source to increase its output bit rate so that the network bandwidth may be more efficiently utilized. If the effective throughput of the network after the increase of source output bit rate drops significantly, the source may reduce its output bit rate until the effective throughput returns to the level before the source output bit rate increase. Additionally, packet delay and queue jitter information may be collected and used for queue rate adaptation as well as bandwidth adaptation.

20 Claims, 8 Drawing Sheets

OTHER PUBLICATIONS

"U.S. Appl. No. 11/240,085, Notice of Allowance mailed Sep. 13, 2011", 7 pgs.

"U.S. Appl. No. 11/240,085, Response filed Feb. 26, 2010 to Final Office Action mailed Nov. 30, 2009", 13 pgs.

"U.S. Appl. No. 11/240,085, Response filed Aug. 3, 2009 to Non Final Office Action mailed Apr. 1, 2009", 10 pgs.

"U.S. Appl. No. 11/240,085, Response filed Dec. 29, 2008 to Non Final Office Action mailed Jun. 27, 2008", 10 pgs.

* cited by examiner

302: $TxRate = TxBits/measTime$;
304: $\Delta TxBits = 0$;
306: If $(IdleTime > IdleMinThreshold)$
308: $\quad \Delta TxBits = \rho * TxBits * [IdleTime / (TxTime + BackoffTime + PacketProcDelay)]$;
310: else
312: $\quad TxRateDiff = TxRatePrevious - TxRate$;
314: $\quad$ If $(TxRateDiff > MinRateDiffThreshold)$
316: $\quad\quad \Delta TxBits = -\beta * MeasTime * TxRateDiff$;
318: $\Delta TxRate = \Delta TxBits/MeasTime$;
320: $AvailTxRate = TxRate + \Delta TxRate$;
322: $TxRatePrevious = TxRate$;
324: $TxDelayPrev = TxDelay$;
326: $TxDelay = TxQueueDepthInBits/TxRate$;
328: $TxJitter = TxDelay - TxDelayPrev$;
330: Perform TxQueueRateAdaptation ();
332: ReturnToAppLayer(TxRate, AvailTxRate, TxDelay, TxJitter);

*FIG. 3*

```
410:  TxQueueRateAdaptation()
      {
420:    ForEachPacketInTxQueue
        {
430:      Let S = set of packets in queue ahead of a Packet;
440:      EstimatedPacketDelay = QueueDepthForS /TxRate;
450:      If (EstimatedPacketDelay > AllowedPacketDelay)
          {
460:        If PacketPriorityIsHigh
470:          DropLowPriorityPacketsInS;
480:        else DropPacket;
          }
        }
      }
```

FIG. 4

```
502: IncrementalRateAdaptation() {
504:     TransmitData(SmallInitialTxRate);
506:     ObtainNetworkFeedback(TxRate0, AvailTxRate0);
508:     DiffTxRate0 = AvailTxRate0 - TxRate0;
510:     ChangeTxRate = y0 * DiffTxRate0;  /* 0 ≤ y0 ≤ 1 */
512:     AttemptTxRate = TxRate0 + ChangeTxRate0;
514:     TransmitData(AttemptTxRate);
516:     AvailTxRateOld = AvailTxRate0;
518:     ObtainNetworkFeedback(TxRateNew, AvailTxRateNew);
520:     ChangeInTxRate = TxRateNew - TxRate0;
```

/* AvailTxRateNew is a function of the available network idle time. This idle time can be the idle time as observed at the transmitting source node in the wireless network route, or the minimum of the idle times of all the sub-networks in the wireless network route. */

```
522:     While ( (AvailTxRateNew > Delta0)&&(TxRateNew <
                 MaxDesiredTxRate) && (ChangeInTxRate >Delta1) ) {
524:         DiffTxRateNew = AvailTxRateNew – TxRateNew;
526:         DiffTxRateUsed = AvailTxRateOld – AvailTxRateNew;
528:         y1 = ChangeTxRate / DiffTxRateUsed;
530:         ChangeTxRate = y1 * κ * DiffTxRateNew;  /* 0 ≤ κ ≤ 1 */
532:         AttemptTxRate = TxRateNew + ChangeTxRate;
534:         If (AttemptTxRate > MaxDesiredTxRate) {
536:             AttemptTxRate = MaxDesiredTxRate;
538:             ChangeTxRate = ChangeTxRate + (MaxDesiredRate –
                                   AttemptTxRate);
             }
540:         If (ChangeTxRate > Delta1) TransmitData(AttemptTxRate);
542:         TxRateOld = TxRateNew;
544:         AvailTxRateOld = AvailTxRateNew;
546:         ObtainNetworkFeedback(TxRateNew, AvailTxRateNew);
548:         ChangeInTxRate = TxRateNew – TxRateOld;
         }
     }
```

TRANSMISSION ADAPTATION IN A WIRELESS NETWORK

PRIORITY APPLICATION

This application is a continuation of U.S. application Ser. No. 11/240,085, filed Sep. 30, 2005 now U.S. Pat. No. 8,098,603, which is incorporated herein by reference in its entirety.

BACKGROUND

1. Field

This disclosure relates generally to data transmission in a wireless network and, more specifically, to bandwidth adaptation for a multi-media application in a wireless network.

2. Description

In a wireless communication network (e.g., an 802.11 network), a protocol such as a Carrier Sense Multiple Access with Collision Avoidance (CSMA/CA) protocol may be used, which may allow only one wireless transmission in progress at a given time in the same channel. Thus, available time on the network may need to be shared between different users active in the network. In addition if there is other unrelated traffic in the network, bandwidth needs to be shared with those traffic components as well. Time utilization with respect to a node in a wireless LAN network can be broken down into several components, one of which is network idle time. The network idle time is perceived by a given node with respect to the wireless medium, during which the given node is neither transmitting nor receiving nor is it in a backoff stage, and nor is any other node transmitting over the medium. It is desirable for an application, e.g., a multimedia application, to adapt its transmitting bit rate to efficiently make use of available time/bandwidth in a wireless network.

BRIEF DESCRIPTION OF THE DRAWINGS

The features and advantages of the disclosed subject matter will become apparent from the following detailed description of the present disclosure in which:

FIG. 3 is an example pseudo code for bandwidth adaptation based on real-time network statistics in a wireless network;

FIG. 4 is an example pseudo code for transmission queue rate adaptation based on real-time statistics in a wireless network;

FIG. 5 is another example pseudo code for bandwidth adaptation based on real-time network statistics in a wireless network;

DETAILED DESCRIPTION

According to embodiments of disclosed subject matter in the present application, time utilization of a wireless network is monitored and statistics of time distribution are gathered in real time. Depending on the value of the available network idle time, a portion or all of the available network idle time may be used by an application source to increase its data transmission rate so that the network bandwidth may be more efficiently utilized. Additionally, the effective throughput of the network before and after the application source increases its data transmission rate may be monitored. If the effective throughput of the network consistently drops significantly after the transmission rate increase by the application source, the portion of the available network idle time, which was originally used to transmit more data by the application source, may be reduced until the effective throughput of the network returns to the level before the transmission rate increase by the application source.

Moreover, delay information of packets to be transmitted and jitter information of a packet queue may be measured and used to adapt the transmission data rate by an application source. If an application source transmits data over a multi-link path, link conditions and link utilizations of all the links in the path need to be considered to obtain statistics of idle time, available bandwidth, effective throughput, and others of the network. These statistics may then be used for adapting the transmission data rate of an application source to improve the bandwidth usage of the network.

Reference in the specification to "one embodiment" or "an embodiment" of the disclosed subject matter means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
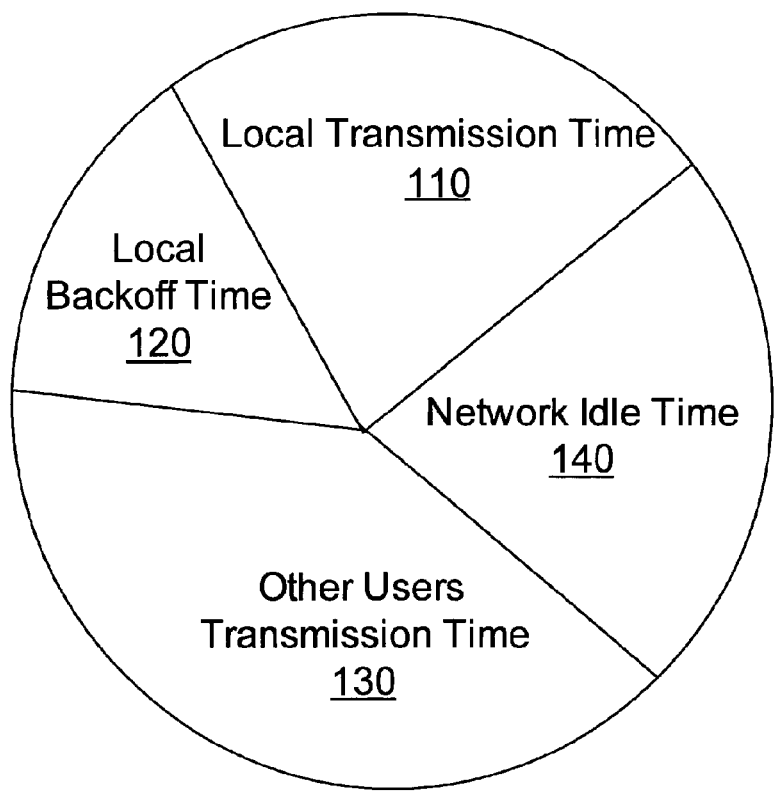
FIG. 1 illustrates an example chart of time utilization distribution in a wireless network.

FIG. 1 illustrates an example chart of time utilization distribution in a wireless network. Time utilization with respect to a node in a wireless LAN network can be broken down into several components, e.g., Total time=Local Transmission Time 110+Local Backoff Time 120+Other Users Transmissions 130+Network Idle Time 140. The local transmission time includes protocol timing overheads and time spent in receiving an acknowledgement. The local backoff time includes the time spent in the random backoff counter prior to transmission. The other users transmissions time include protocol timing overheads for their transmissions and time spent for acknowledgements for their transmissions. The network idle time is perceived by a given node with respect to the wireless medium, during which the given node is neither transmitting nor receiving nor is it in a backoff stage, and nor is any other node transmitting over the medium. For a saturated network with several users, the network idle time may be assumed to tend to 0. However, it is possible that a significant non-zero idle time may be perceived in a saturated network, when no users are transmitting because all users may be in a backoff stage and counting down on their backoff counters.

Figure 2:
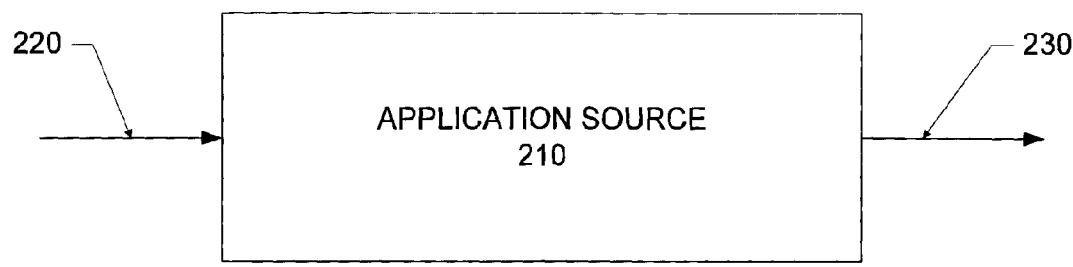
FIG. 2 is a block diagram illustrating how an application source determines a bit rate for transmitting data in a wireless network.

FIG. 2 is a block diagram illustrating how an application source determines a bit rate for transmitting data in a wireless network. Typically multimedia data (e.g., a video stream) allows for the ability to exploit scalability in different forms such as spatial, temporal and signal-to-noise ratio (SNR)

scalability. When bandwidth fluctuations occur in a wireless network environment, a multimedia application can be designed to adapt to such changing conditions by monitoring changes in the channel conditions, by exploiting the scalability inherent in the multimedia representation. As shown in FIG. 2, an application source 210 may produce an output source bit rate 230 ("Sbr") given an input suggested available bandwidth on the network 220 ("Bavail"). It is desirable that Sbr does not exceed Bavail. The spatial, temporal, and SNR scalability options available in multimedia representation of the application source may be used to scale up or scale down Sbr in response to changing channel conditions in the wireless network.

To efficiently make use of bandwidth resources on a wireless network, it is thus desirable to monitor the appropriate statistics in the wireless network and produce a reasonably accurate estimate of the available bandwidth that can be provided as input to an application source (e.g., 210). In addition to adapting to available bandwidth in a communication path between two end-points, it is also desirable to ensure that the end-to-end delay constraints for the multimedia application are also satisfied along the chosen communication path.

In one embodiment, network statistics such as local transmission time (TxTime), local backoff time (BackoffTime), network idle time (IdleTime), and packet processing delay (PacketProcDelay) may be measured. Within a period of monitoring time (measTime), one can measure TxTime and BackoffTime associated with all packets (the number of bits transmitted (TxBits)) at the physical layer and/or media access control in the protocol stack. The TxTime refers to both the actual transmission time associated with the packets, and the protocol overhead time such as inter-frame spacing and acknowledgement time, etc. In a wireless local area network ("LAN") with 802.11e priority queues (WMM) enabled, TxTime may be monitored with respect to the packet queue. Once TxTime is obtained, the effective throughput for the traffic may be computed as TxBits/measTime.

The statistic, IdleTime, is an indicator of the network idle time, and not merely idle time for a given node. The IdleTime refers to the time when the local node is neither transmitting nor receiving nor is it in a backoff stage, and nor is any other node transmitting over the medium. Thus, IdleTime refers to the network idle time as perceived at a given node with respect to the wireless medium. If there is IdleTime available during the measTime, such additional time may be used for increasing the bandwidth associated with the multimedia traffic. Since IdleTime measured may not be completely accurate as other users may join the network or attempt to increase their data rates, it may be wise to be gradually opportunistic and request for only a fraction $\rho$ (e.g., $\rho=0.8$) of the available IdleTime on the network, where $\rho$ is a transmission efficiency factor ($0 \leq \rho \leq 1$) to account for the fraction of the IdleTime that can be used for increase transmission rate. Assume that remaining transmissions continue at their current utilization levels of the network. If additional multimedia traffic is pumped into the network, it would primarily impact the statistics of TxTime, and BackoffTime for the multimedia traffic, and leave other statistics related to time unchanged. Since TxBits are transmitted in the time (TxTime+BackoffTime), it may be expected that TxBits*$\rho$*[IdleTime/(TxTime+BackoffTime)] would be the additional bits that may get transmitted in the additional time allocated from the available IdleTime. This assumes that the relative distribution of time between TxTime and BackoffTime remains unchanged. It should be noted that if the perceived available IdleTime is small, it might not be wise to assume that there is additional bandwidth available. This small available value in the IdleTime could be a manifestation of dynamically varying network conditions, or variation in the output of the application source. When it is known that the stream may have to traverse multiple hops, this implies that the available IdleTime needs to be shared across multiple hops, and hence one may have to choose a smaller value of $\rho$ (such as 0.4 for 2 hops) to allocate sufficient time for data transfers on each of the hops.

Additionally, it may be useful to monitor any reduction in effective throughput and to associate such reduction with a drop in the available bandwidth in the network for a multimedia stream based on link adaptation to a lower modulation and coding scheme ("MCS") or additional congestion or interference in the network. Use $\delta$ to denote the average difference between Bavail and Sbr. If a drop in available bandwidth is greater than $\delta$, it may be reasonably certain that this loss of bandwidth is not an artifact of the application source producing an output stream that has a low bit rate to begin with. Under such circumstances, it may be wise to throttle back on the estimated bandwidth available on the network to a fraction of its value. By measuring the current and previous values of the effective throughput over two measurement intervals, the difference in throughput values may be estimated. The new value of the available bandwidth can be reduced by a fraction of this observed difference in throughput.

In addition to using the available IdleTime and reduction of effective network throughput for bandwidth adaptation, information of packet delay and packet queue jitter may be used for transmission queue rate adaptation as well as bandwidth adaptation. By monitoring the queue depths of packets related to the multimedia data queue, delay estimates may be obtained. The quantity (measTime−IdleTime) may be used to approximate the total delay in the network to deliver TxBits across the network. If there are QueueBits available in the multimedia data queue, a new packet inserted into the queue has to wait for the QueueBits to be transmitted across the network. Thus, the current delay can be estimated to be given by (QueueBits/TxBits)*(measTime−IdleTime). By averaging the estimates of the current delay over several measurement periods of duration T, one can obtain an estimate for the average delay. By taking the difference in values of the current delay across two measurements, one can obtain an estimate for the perceived instantaneous jitter in the network. By taking the difference in values between the current delay and the average delay, an estimate of the average jitter in the network may be obtained. The packet delay and queue jitter information may be used to decide if any packet in the queue should be dropped. Such information may also be used for bandwidth adaptation. For example, if the delay becomes significantly longer after additional bits being added to the network, the number of the additional bits may be reduced.

FIG. 3 is an example pseudo code for bandwidth adaptation based on real-time network statistics discussed above in a wireless network. Assume that statistics such as TxBits, IdleTime, BackoffTime, PacketProcDelay, packet transmission delay (TxDelay), and transmission queue depth in bits (TxQueueDepthInBits) have been obtained. At line 302, current transmission rate (TxRate) may be computed. At line 304, the difference between TxRate before and after bandwidth adaptation, $\Delta$TxBits, may be initialized to zero. At line 306, a decision whether IdleTime is larger than a threshold, IdleMinThreshold, may be made. The value of IdleMinThreshold may be predetermined according to typical network behavior. Initially, IdleMinThreshold may be set to zero; after several iterations of bandwidth adaptation, it may be found that no benefit may be obtained by using any available IdleTime for transmitting additional data when IdleTime is smaller than a certain value. This certain value may then be used as IdleMinThreshold. If IdleTime is larger than IdleMinThreshold, a portion of IdleTime may be used for data transmission and additional bits to be transmitted may be calculated at line 308; otherwise, operations from line 312 to line 316 may be performed.

The value of ρ may initially be set to a random value (e.g., 0.8). After several iterations of bandwidth adaptation, it may be found that a certain value or a certain range of values may reflect the network characteristics better than others. Then that value or the average of the range of values may be used for p. At line 312, transmission rate difference (TxRateDiff) may be calculated. At line 314, a decision whether TxRateDiff is larger than a threshold, MinRateDiffThreshold, may be made. The MinRateDiffThresho/d has a positive value and represents a reduction of the network effective throughput. The value of MinRateDiffThreshold may be predetermined based on previous network performance. For example, it may be found that a reduction of the effective throughput within a certain range only represents normal working conditions of the network. The upper limit of that range may then be used as the value of MinRateDiffThreshold. If TxRateDiff is larger than MinRateDiffThreshold, it may suggest that additional bits added to the network are too many and thus require a reduction. At line 316, such a reduction of additional bits may be computed, where β is a transmission rate reduction factor that can be used to decide how much the transmission rate should be reduced when the effective transmission rate falls below a threshold. It can be set to overcompensate (β>1) or conservatively compensate (β<1) as the transmission rate is adapted based on dynamically changing network conditions. The value of β may also be determined randomly and/or according to previous network performance. At line 318, the change of the transmission rate after bandwidth adaptation, ΔTxRate, may be calculated. At line 320, available transmission rate after bandwidth adaptation, AvailTxRate, may be obtained. At line 322, the value of previous TxRate, TxRatePrevious, may be set to the value of the current TxRate.

At line 324, the value of previous packet transmission delay, TxDelayPrev, may be set to the value of the current packet transmission delay, TxDelay. At line 326, the value of TxDelay may be updated using the ratio of TxQueueDepthInBits and TxRate. At line 328, transmission queue jitter, TxJitter, may be computed. At line 330, an optional transmission queue rate adaptation may be performed. At line 332, values of TxRate, AvailTxRate, TxDelay, and TxJitter may be returned to the application layer so that the application may use this data to adapt its output bit rate to the available bandwidth of the network. Operations from line 302 to line 332 may be performed at the end of each period of monitoring time, measTime.

FIG. 4 is an example pseudo code for transmission queue rate adaptation based on real-time statistics in a wireless network, which is shown as an operational function at line 330 in FIG. 3. Line 410 starts the transmission queue rate adaptation function. The function mainly comprises an iteration loop starting from line 420. The operations inside the iteration loop (i.e., operations from line 430 to line 480) are performed for each packet in the transmission queue. At line 430, a set of packets, S, is defined to include all of the packets ahead of the packet at issue. At line 440, an estimate of delay for this packet, EstimatedPacketDelay, may be computed. At line 450, a decision whether EstimatedPacketDelay is larger than the value of an allowable packet delay, AllowedPacketDelay, may be made. The value of AllowedPacketDelay may be predetermined based on the requirements of an application/task. If EstimatedPacketDelay is larger than AllowedPacketDelay, the properties of the packet are checked to determine if the packet has a high priority at line 460. If it does, packets in set S which have lower priority than this packet may be dropped out of the queue at line 470; otherwise, the packet itself may be dropped out of the queue at line 480.

FIG. 5 is another example pseudo code for bandwidth adaptation based on real-time network statistics in a wireless network. If the example shown in FIG. 3 is labeled as "one-step" bandwidth adaptation, the example shown in FIG. 5 may be called incremental bandwidth adaptation. The basic idea underlying the example shown in FIG. 5 is that the transmission rate is changed incrementally. This may be done when there is incomplete information about the wireless network and the path taken in the wireless network. It is likely that increasing the application data rate may require the data packets to travel over multiple hops in the network. When the conditions of all the hops are not known but the idle time available in the network is known, one may attempt to slowly increase the data rate in the network. The reduction in the available data rate (which is related to the available network idle time) in response to an incremental change in the data rate is recorded, and the remaining idle time is obtained from the network statistics. Subsequently, the data rate is further increased by larger factors, as more of the network idle time is used up. The incremental rate adaptation is done until further attempts to increase the application data rate fail to cause improvements in the observed application data rate as monitored by the statistics. If the observed application data rate continues to increase, then the application data rate is incrementally increased until the application data rate reaches the maximum value required by the application.

It is possible that in a multi-hop network, the data packets may travel through multiple wireless sub-networks (each sub-network could be an independent or infrastructure basic service set), each of which may have a different amount of idle time. In this case, the adaptation algorithm may need to exploit the minimum available idle time over all the wireless sub-networks. In the adaptation approach shown in FIG. 3, this minimum available idle time may be needed to take a decision on how to adapt the application data rate. In the absence of information from all of the different sub-networks, the incremental adaptation technique may be used so that small changes in the application data rate may be attempted until further attempts to increase the application data rate do not provide corresponding increases in the observed application data rate over the network. If the observed application data rate continues to increase, the application data rate may be further incrementally increased until the application data rate reaches the maximum value required by the application.

The example pseudo code in FIG. 5 is self-explanatory and incorporated herein as part of the specification.

The principle underlying the bandwidth adaptation schemes discussed above apply to direct transmission paths as well as multi-link transmission paths. Some additional operations may be needed when implementing these bandwidth adaptation schemes for multi-link paths in the same channel. Assume that there are N links of the transmission path in the same channel. In general, it may be necessary to obtain information of the link quality (how fast bits are transferred on a link) and link utilization (how often a link is available for bits to be transferred on the link) for each of the links.

Figure 6A:
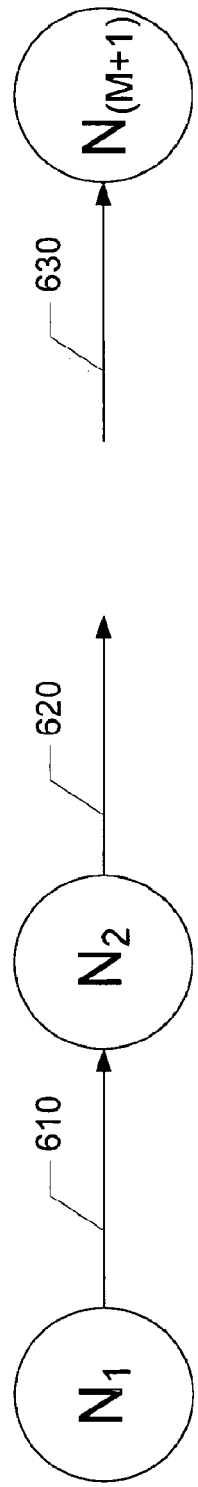
FIGS. 6A-6B show a multi-hop transmission path and network time utilization by links in the path in a wireless network.

Consider a multi-link one-way transmission path shown in FIG. 6A with a multimedia transmission source node $N_1$ and a destination node $N_{(M+1)}$. Assume also that statistics information about each of the M links (e.g., links 610, 620, and 630) is available at the source node $N_1$. This information may be obtained with the intermediate nodes such as access points monitoring their own statistics and transferred through a lightweight process to the source node. A mechanism may be required to enable the transfer of information from intermediate nodes to the source node $N_1$. It should be noted that such an information-transfer overlay mechanism needs to be lightweight and relatively infrequent (typically of the order of a few 100s of milliseconds for example) so that it consumes very little of the network bandwidth relative to the multimedia data transmissions in the wireless network. Alternatively, the source node $N_1$, or some other node, may sniff other packets in its neighborhood to get an understanding of the quality of links in its range. When sniffing it should be noted that it is possible that information may be monitored in one direction but not in the other, or on some links but not other links. For example, node $N_1$ could sniff packets transmitted from $N_2$ to $N_3$ but may not be able to sniff information (such as acknowledgements) from $N_3$ to $N_2$, or from $N_3$ to $N_4$. As more information becomes available, the estimate about link quality and link utilization on each of the links can be improved. Once information about each of the M links is obtained, the end-to-end performance of the wireless multimedia stream may be understood.

If data is flowing in a nice pipelined manner through each of the links, then during a measurement time T, it may be expected that the same number of bits transferred across each link (TxBits). If the multimedia source output is variable bit rate ("VBR") in nature, the measurement time T is assumed to be long enough to average out the variability in the VBR stream. Efficient scheduling of traffic over the multiple links may help with improving the utilization of bandwidth in the network. However, the quality of each of the links may vary depending on the link quality. Some links may require more robust modulation and coding schemes which may take longer to transmit the same amount of data.

Figure 6B:
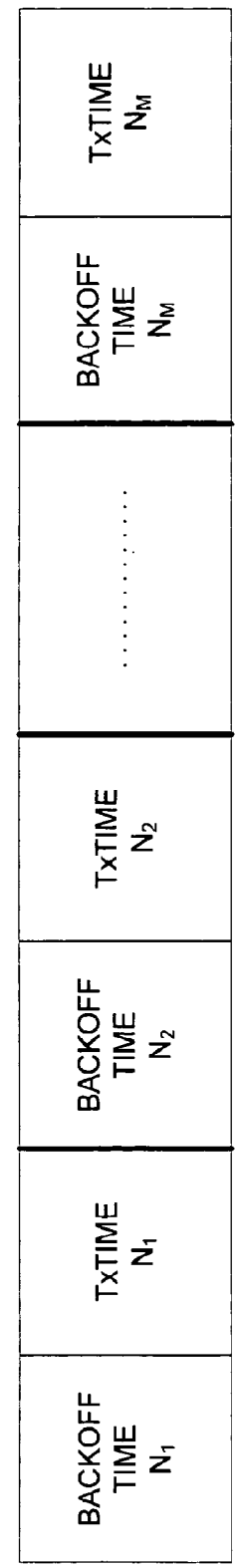

FIG. 6B is an example table showing TxTime and BackoffTime distribution for each of the transmitting nodes as depicted in FIG. 6A. Once again, it should be noted that this TxTime refers to both the transmission time and the additional protocol overheads such as inter-frame spacing and acknowledgement time for each packet. All of the overheads of retransmission attempts are also included. If there is IdleTime available in the network and it is desired to increase the multimedia source bit rate, then the additional bits added to the network need to travel over each of the links. Assume that TxBits are transmitted over a period of measurement time T, and let TxTotal be the sum of BackoffTime and TxTime over all the links (i.e., TxTotal=$\Sigma_i$(BackoffTime$_i$+TxTime$_i$)). Then additional bits (AdditionalTxBits) that can be transferred may be given by $\rho$*TxBits*(IdleTime/TxTotal), where $\rho$ is a fractional parameter to ensure that the adaptation is gradually opportunistic with a fraction of the available bandwidth being taken by the multimedia stream. If statistics are available for only one link, $\rho$ can be used as a correction factor to account for transmission being required for each of the links. It should also be noted that it is possible that some of the links may be out of range of other links, and transmissions over some links may occur in parallel. In that case, the subset of nodes, which cannot transmit simultaneously due to the nature of the wireless protocol such as Carrier Sense Multiple Access with Collision Avoidance (CSMA/CA) and which have the largest combined estimate of TxTotal, should be considered to identify how many additional bits to be transferred.

It is possible that the conditions on one of the links may worsen over time and as a result the throughput of the entire path may drop. In that case, it may be necessary to reduce the Bavail input to the multimedia source as shown in FIG. 2, with a correction proportional to the difference in throughput. A change to the Bavail input should be made only if there is a significant difference in throughput with respect to multimedia source output variability or small fluctuations in network conditions.

While available IdleTime may be used to increase end-to-end throughput, other options may also be considered for providing positive feedback to increase multimedia transmission bandwidth in the network. For example, if improvements of the link quality are perceivable over the worst link in an end-to-end path, this information may be used to increase the output data bit rate from the source. When sniffing at traffic leaving a node, it is possible to observe changes in the modulation and coding scheme being used with link adaptation at the node by parsing header information, and to observe successful transmissions with the modulation and coding scheme. Information thus observed may be used as an indication of improved link quality. However, some amount of statistics may need to be gathered to correctly estimate improved link quality as a means to improve end-to-end throughput.

The effective end-to-end throughput is reported as the minimum of the effective throughputs over each of the links. The end-to-end delay estimate is a cumulative delay over all the links taking into account the queue depth at each of the links and the corresponding service time in the queue. The end-to-end jitter estimate is also cumulative, noting that contributions to the jitter over some links may be positive and over other links may be negative, based on whether queue depths have increased or decreased in each of the links.

Figure 7:
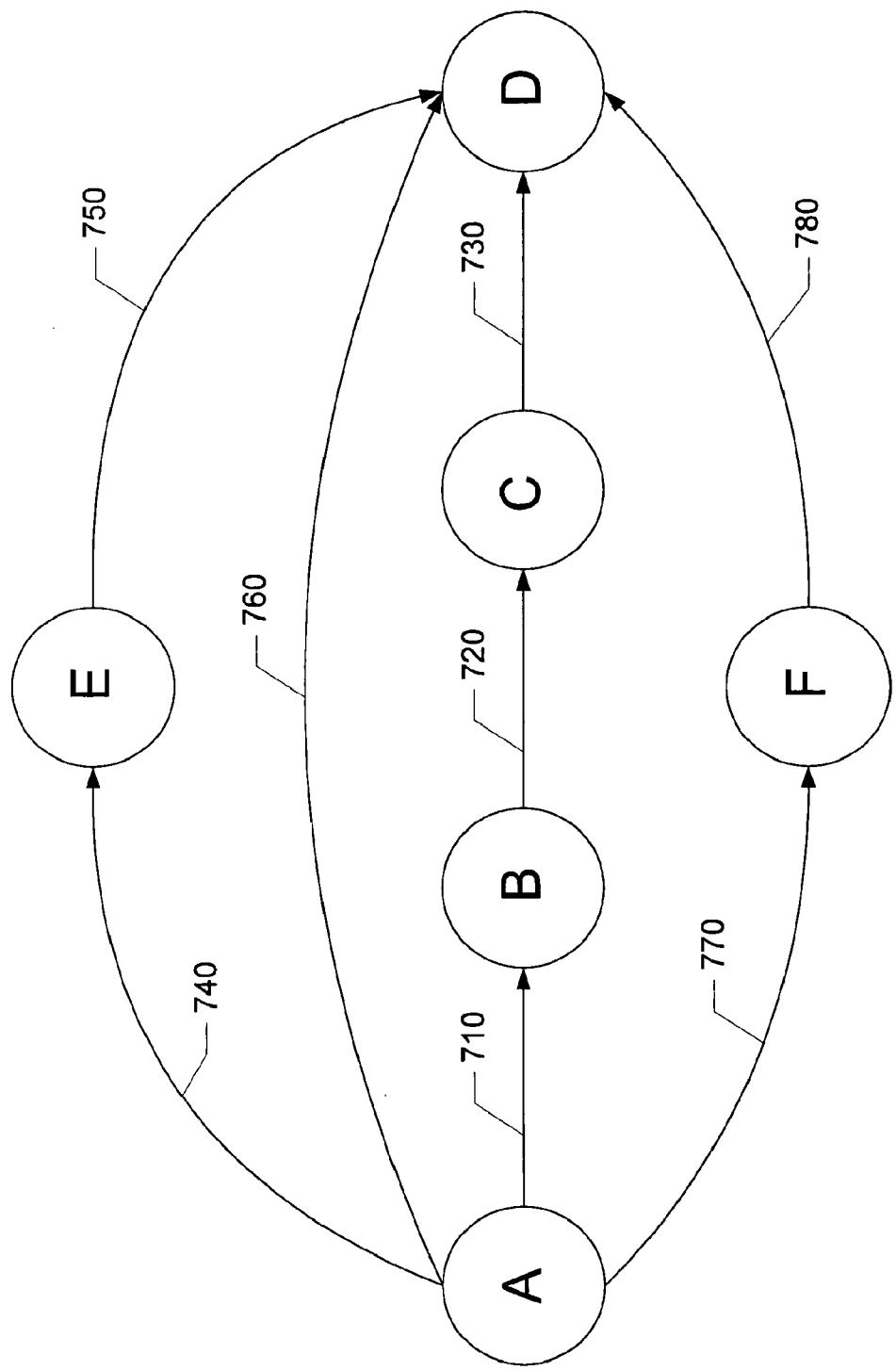
FIG. 7 is a schematic diagram showing multiple paths between a source node and a destination node in a wireless network.

For real-time multimedia transmissions, it is desirable to meet both end-to-end delay requirements and the minimal performance requirements regarding available bandwidth for the application. Multiple paths may be available between two end-points. FIG. 7 is a schematic diagram showing multiple paths between a source node A and a destination node D in a wireless network. There four possible paths between node A and node D: a path including links 740 and 750, a path including only link 760, a path including links 710, 720, and 730, and a path including links 770 and 780. When attempting to choose between alternative paths (e.g., direct or multi-link) with different routes or different number of links, end-to-end delay requirements should be met first. It is possible that links in a multi-hop path may have very good quality, but the overall end-to-end delay may be large due to congestion delays incurred at each link, which cumulatively may make the multi-hop path undesirable. Once the end-to-end delay requirements are met and there are still options to choose between different routes in a wireless network, a path that provides the best end-to-end throughput should become an attractive candidate. In one embodiment, test traffic may be sent along different paths at regular intervals to select the best possible route with the highest reported available transmission rate as conditions dynamically vary.

Figure 8:
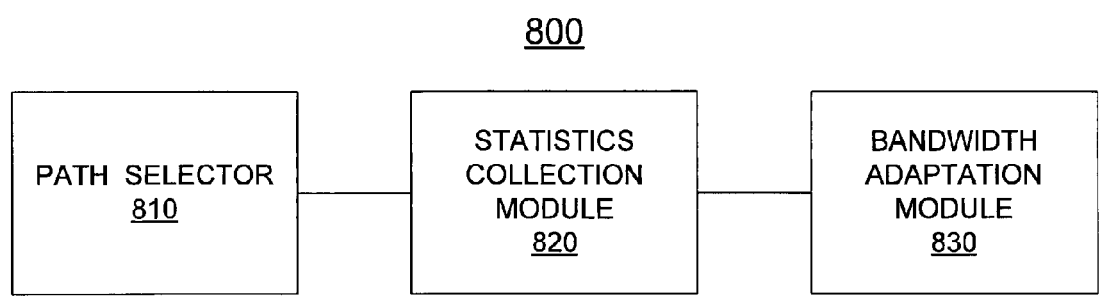
FIG. 8 is an example block diagram of an apparatus that selects a transmission path, and performs bandwidth adaptation based on real-time network statistics in a wireless network.

FIG. 8 is an example block diagram of an apparatus 800 that selects a transmission path, and performs bandwidth adaptation based on real-time network statistics in a wireless network. The apparatus comprises a path selector 810, a statistics collection module 820, and a bandwidth adaptation module 830. The path selector may first identify all possible transmission paths between a source node and a destination node. Second, the path selector may check if all of these possible transmission paths meet the end-to-end delay requirements as determined by an application/task, based on network statistics. Only those paths that meet the end-to-end delay requirements become candidate for data transmission from the source node to the destination node. Third, the path selector may select a path among the candidate paths that provides the best end-to-end throughput for data transmission, based on network statistics. In one embodiment, test traffic may be sent along different paths at regular intervals to select the best possible route with the highest reported available transmission rate as conditions dynamically vary.

Statistics collection module 800 may collect real-time network statistics such as transmission rate, backoff time, idle time, transmission bits during a period of measurement time, packet delay, queue jitter, and so on, for each transmitting node in the transmission path selected by path selector 810. The statistic collection module periodically collects statistics during a period of measurement time. Bandwidth adaptation module 830 may use real-time network statistics collected by the statistic collection module to adapt the output data bit rate of a multimedia source. The bandwidth adaptation module may use bandwidth adaptation schemes disclosed in this application.

Figure 9:
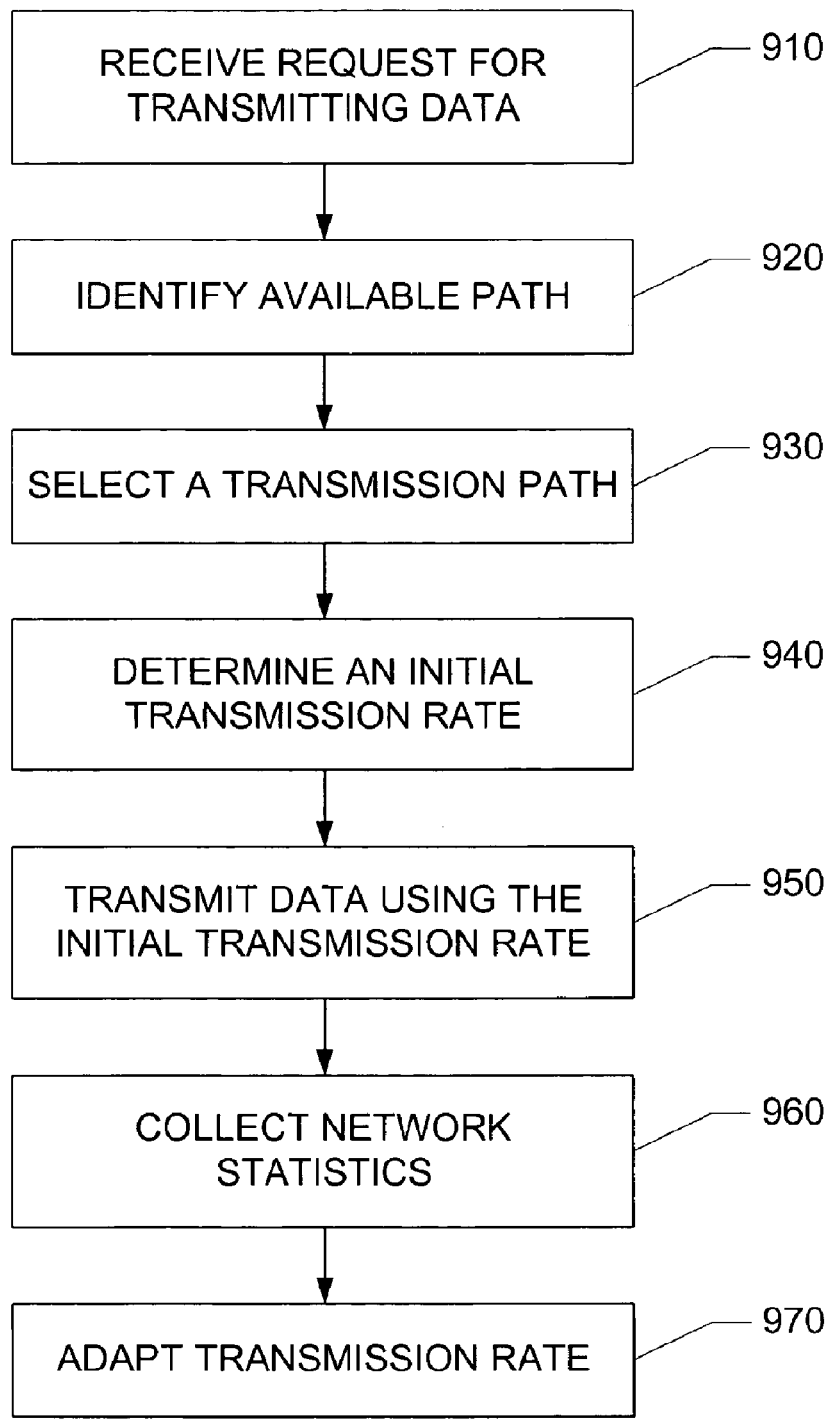
FIG. 9 is a flowchart of one example process for transmitting multimedia data from a source node to a destination node using a real-time network statistics based bandwidth adaptation technology in a wireless network.

FIG. 9 is a flowchart of one example process 900 for transmitting multimedia data from a source node to a destination node using a real-time network statistics based bandwidth adaptation technology in a wireless network. At block 910, a request for transmitting multimedia data from a source node to a destination node may be received. At block 920, all available paths between the source node and the destination node may be identified. At block 930, a transmission path among those available paths may be selected for transmitting the multimedia data from the source node to the destination node. The path selection process may involve narrowing those available paths identified at block 920 down to a set of candidate paths by eliminating those paths that cannot meet end-to-end delay requirements as determined by the multimedia source. The path selection process may further involve selecting one path in the set of candidate paths that can provide the best end-to-end throughput. In one embodiment, test traffic may be sent along different paths at regular intervals to select the best possible route with the highest reported available transmission rate as conditions dynamically vary.

At block 940, an initial transmission rate may be determined partly based on criteria set by the multimedia source (e.g., the maximum time period during which all of the data must be received by the destination node), and partly based on the network characteristics (e.g., channel and protocol used). At block 950, the multimedia source may use the initial transmission rate to transmit the multimedia data. At block 960, network statistics, such as transmission rate, backoff time, idle time, transmission bits during a period of measurement time, packet delay, queue jitter, and so on, may be collected for each transmitting node in the selected transmission path. Statistics are collected periodically with each period being a period of measurement time. At block 970, bandwidth adaptation may be performed based on the collected real-time network statistics. The bandwidth adaptation process may use those adaptation schemes as disclosed in this application.

Although an example embodiment of the disclosed subject matter is described with reference to block and flow diagrams in FIGS. 1-9, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An apparatus for performing wireless transmission adaptation in a wireless network, the apparatus comprising:
   at least one memory unit; and
   at least one processor operably coupled to the at least one memory unit and configured to operably execute instructions associated with a set of modules, the set of modules including:
   a path selector module arranged to receive a request from a data source to transmit data from a source node to a destination node and to select a transmission path for transmission of data packets between the source node and the destination node through a coordinator node in a wireless network, the wireless network being a packet switched wireless network and implementing a collision avoidance protocol;
   a statistics collection module at the coordinator node arranged to track a contribution of each node in the transmission path to data packet traffic in the wireless network; and
   a wireless transmission adaptation module arranged to determine one or more variable backoff time values for each node in the transmission path, and to provide the variable backoff time values from the coordinator node to the source node and to each node in the transmission path, wherein the variable backoff time values for a particular node are increased based on a higher contribution of the particular node to data packet traffic in the wireless network and decreased based on a lower contribution of the particular node to data packet traffic in the wireless network, the variable backoff time values determined independently of transmission power for transmissions providing data packet traffic in the wireless network;
   wherein a transmission of the data on the wireless network from the source node and each node in the transmission path is performed in connection with use of the variable backoff time values.

2. The apparatus of claim 1, wherein to select a transmission path from the source node to the destination node, the path selector module is arranged to identify available transmission paths from the source node to the destination node, select a set of candidate paths among the available transmission paths, and select, in the set of candidate paths, one that provides a highest throughput between the source node and the destination node as the transmission path, wherein each candidate path in the set of candidate paths meets requirements of delay between the source node and the destination node provided by the data source.

3. The apparatus of claim 1, further comprising:
   a bandwidth adaptation module arranged to adapt an output bit rate of the data source to available bandwidth on the wireless network based on the contribution of each node in the transmission path to data packet traffic in the wireless network.

4. The apparatus of claim 3, wherein the bandwidth adaptation module is arranged to determine the available bandwidth based on network idle time, wherein the network idle time is an amount of time when there are no packetized transmissions over a wireless channel of the wireless network detected by the coordinator node and when the coordinator node is not in a wireless transmission backoff stage, and wherein the bandwidth adaptation module is arranged to increase the output bit rate by using a portion of the network idle time if the network idle time is larger than a predetermined minimum idle time value, to monitor an effective throughput of the network after increasing the output bit rate, and to reduce the output bit rate if the effective throughput drops and the amount of the effective throughput reduction exceeds a predetermined threshold.

5. A coordinator device node, comprising:
   at least one processor; and
   at least one memory unit, the at least one memory unit providing a plurality of instructions that, in response to being executed by the at least one processor, cause the coordinator device node to perform operations that:
   track a contribution of each device node in a transmission path to data packet traffic in the wireless network, the transmission path provided from a source device node to a destination device node through the coordinator device node in a packet switched wireless network implementing a collision avoidance protocol;
   determine one or more variable backoff time values for each device node in the transmission path, the variable backoff time values for a particular device node being increased based on a higher contribution of the particular device node to data packet traffic in the wireless network, the variable backoff time values determined independently of transmission power for transmissions providing data packet traffic in the wireless network; and
   provide the variable backoff time values to the source device node and each device node in the transmission path;
   wherein data on the wireless network is transmitted with use of the variable backoff time values at the source device node and each device node in the transmission path.

6. The coordinator device node of claim 5, wherein at least one of the variable backoff time values is provided as a backoff counter value used to provide backoff for a corresponding number of backoff time periods, and wherein the variable backoff time values for device nodes in the transmission path are increased based on a higher contribution of a particular device node to data packet traffic in the wireless network and decreased based on a lower contribution of a particular device node to data packet traffic in the wireless network.

7. The coordinator device node of claim 5, wherein the coordinator device node further performs operations that:
   adapt an output bit rate of the data source to available bandwidth on the wireless network based on the contribution of each device node in the transmission path to data packet traffic in the wireless network.

8. The coordinator device node of claim 7, wherein operations that adapt the output bit rate of the data source to the available bandwidth are performed after each period of measurement time and include:
- determining the available bandwidth based at least in part on network idle time, wherein the network idle time is an amount of time when there are no packetized transmissions over a wireless channel of the wireless network detected by the coordinator device node and when the coordinator device node is not in a wireless transmission backoff stage;
- increasing the output bit rate by using at least a portion of the network idle time if the network idle time is larger than a predetermined minimum idle time value;
- monitoring an effective throughput of the wireless network after increasing the output bit rate; and
- if the effective throughput drops and the amount of the effective throughput reduction exceeds a predetermined threshold, reducing the output bit rate;
- wherein adapting the output bit rate of the data source to the available bandwidth is performed incrementally.

9. A full function device node operable in a wireless network, the full function device node comprising:
- at least one processor; and
- at least one memory unit, the at least one memory unit providing a plurality of instructions that, in response to being executed by the at least one processor, cause the full function device node to perform operations that:
- process a request to forward data in the wireless network from a source device node to a destination device node along a transmission path through the full function device node, the wireless network being a packet switched wireless network implementing a collision avoidance protocol;
- receive one or more variable backoff time values from a coordinator full function device node providing variable backoff time values to each device node along the transmission path;
- implement the variable backoff time values, wherein the variable backoff time values for the full function device node are determined by the coordinator full function device node and are increased based on a higher contribution of the full function device node to data packet traffic in the wireless network and decreased based on a lower contribution of the full function device node to data packet traffic in the wireless network, wherein the variable backoff time values are independent of transmission power for transmissions providing data packet traffic in the wireless network; and
- perform data transmissions from the full function device node with use of the variable backoff time values.

10. The full function device node of claim 9, wherein at least one of the variable backoff time values is provided as a backoff counter value used to provide backoff for a corresponding number of backoff time periods.

11. A method for wireless transmission adaptation in a wireless network, the method comprising:
- receiving, at a coordinator node, a request from a data source to transmit data from a source node to a destination node in a packet switched wireless network implementing a collision avoidance protocol;
- selecting a transmission path for transmission of packets of the data from the source node to the destination node through the coordinator node;
- tracking, at the coordinator node, a contribution of each node in the transmission path to data packet traffic in the wireless network;
- determining one or more variable backoff time values differing for each node in the transmission path, the variable backoff time values for a particular node being increased based on a higher contribution of the particular node to data packet traffic in the wireless network, and the variable backoff time values determined independently of transmission power for data packet traffic in the wireless network;
- providing the variable backoff time values from the coordinator node to the source node and each node in the transmission path; and
- performing a transmission of the data on the wireless network from the source node and each node in the transmission path in connection with use of the variable backoff time values.

12. The method of claim 11, wherein at least one of the variable backoff time values is provided as a backoff counter value used to provide backoff for a corresponding number of backoff time periods.

13. The method of claim 11, wherein the variable backoff time values for nodes in the transmission path are increased based on a higher contribution of a particular node to data packet traffic in the wireless network and decreased based on a lower contribution of a particular node to data packet traffic in the wireless network.

14. The method of claim 11, wherein selecting a transmission path from the source node to the destination node comprises:
- identifying available transmission paths from the source node to the destination node;
- selecting a set of candidate paths among the available transmission paths, each candidate path meeting requirements of delay between the source node and the destination node provided by the data source ("source end-to-end delay requirement"); and
- selecting, from the set of candidate paths, a candidate path that provides a highest throughput between the source node and the destination node as the transmission path.

15. The method of claim 14, further comprising:
- determining an initial transmission rate for the data source based on the source end-to-end delay requirements and network characteristics; and
- transmitting the data using the initial transmission rate as an output bit rate of the data source.

16. The method of claim 15, wherein the network characteristics comprise transmission channels and a transmission protocol used by the wireless network.

17. The method of claim 11, further comprising:
- adapting an output bit rate of the data source to available bandwidth on the wireless network based on the contribution of each node in the transmission path to data packet traffic in the wireless network.

18. The method of claim 17, wherein adapting the output bit rate of the data source to the available bandwidth on the wireless network comprises:
- determining the available bandwidth based at least in part on network idle time, wherein the network idle time is an amount of time when there are no packetized transmissions over a wireless channel of the wireless network detected by the coordinator node and when the coordinator node is not in a wireless transmission backoff stage; and
- increasing the output bit rate by using at least a portion of the network idle time if the network idle time is larger than a predetermined minimum idle time value.

19. The method of claim 18, further comprising:
- monitoring an effective throughput of the wireless network after increasing the output bit rate; and if the effective throughput drops and the amount of the effective throughput reduction exceeds a predetermined threshold, reducing the output bit rate;

wherein adapting the output bit rate of the data source to the available bandwidth is performed incrementally.

20. The method of claim 19, further comprising performing transmission queue rate adaptation after a period of measurement time based at least on packet delay and queue statistics collected during the period of measurement time.

* * * * *